United States Patent
Jiang et al.

(10) Patent No.: US 10,904,134 B2
(45) Date of Patent: Jan. 26, 2021

(54) MULTICAST PACKET HANDLING IN LOGICAL NETWORKS

(71) Applicant: Nicira, Inc., Palo Alto, CA (US)

(72) Inventors: Jingchun Jiang, Beijing (CN); Caixia Jiang, Beijing (CN); Donghai Han, Beijing (CN)

(73) Assignee: NICIRA, INC., Palo Alto, CA (US)

(*) Notice: Subject to any disclaimer, the term of this patent is extended or adjusted under 35 U.S.C. 154(b) by 32 days.

(21) Appl. No.: 15/460,198

(22) Filed: Mar. 15, 2017

(65) Prior Publication Data
US 2018/0270146 A1 Sep. 20, 2018

(51) Int. Cl.
H04L 12/761 (2013.01)
H04L 12/46 (2006.01)
H04L 29/06 (2006.01)

(52) U.S. Cl.
CPC .......... *H04L 45/16* (2013.01); *H04L 12/4633* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,478,173 B1* | 1/2009 | Delco | H04L 12/2865 709/250 |
| 8,619,771 B2 | 12/2013 | Lambeth et al. | |
| 9,014,007 B2 | 4/2015 | Bhikkaji et al. | |
| 9,306,837 B1 | 4/2016 | Jain et al. | |
| 9,350,657 B2 | 5/2016 | Gross, IV et al. | |
| 9,432,204 B2 | 8/2016 | Shen et al. | |
| 10,567,187 B2 | 2/2020 | Mathew et al. | |
| 10,649,805 B1* | 5/2020 | Mishra | H04L 49/252 |
| 2003/0217183 A1 | 11/2003 | Rimmer et al. | |
| 2003/0231629 A1* | 12/2003 | Banerjee | H04L 12/185 370/390 |
| 2006/0184695 A1* | 8/2006 | Monette | H04L 12/18 709/246 |
| 2007/0104192 A1* | 5/2007 | Yoon | H04L 12/4641 370/389 |
| 2007/0183418 A1* | 8/2007 | Riddoch | H04L 12/18 370/389 |

(Continued)

*Primary Examiner* — Andre Tacdiran
(74) *Attorney, Agent, or Firm* — Su IP Consulting

(57) ABSTRACT

Example methods are provided for a host to perform multicast packet handling in a logical network. The method comprise in response to detecting a request to join a multicast group address, a hypervisor modifying the request by replacing a first address associated with a virtualized computing instance with a second address associated with the hypervisor; and sending the modified request to join the multicast group address on behalf of the virtualized computing instance. The method may also comprise: in response to detecting an egress multicast packet, the hypervisor encapsulating the egress multicast packet with an outer header that is addressed from the second address to the multicast group address; and sending the encapsulated egress multicast packet via one or more multicast-enabled network devices that are capable of forwarding, based on the outer header, the encapsulated egress multicast packet to one or more destinations that have joined the multicast group address.

21 Claims, 8 Drawing Sheets

(56) References Cited

U.S. PATENT DOCUMENTS

| | | | |
|---|---|---|---|
| 2007/0217416 A1* | 9/2007 | Okuda | H04L 12/185 370/390 |
| 2011/0085548 A1* | 4/2011 | Fernandez Gutierrez | H04L 45/16 370/390 |
| 2012/0281697 A1* | 11/2012 | Huang | H04L 12/1886 370/390 |
| 2014/0192804 A1* | 7/2014 | Ghanwani | H04L 49/70 370/390 |
| 2014/0314079 A1 | 10/2014 | Jain et al. | |
| 2015/0009992 A1* | 1/2015 | Zhang | H04L 49/354 370/392 |
| 2015/0103679 A1 | 4/2015 | Tessmer et al. | |
| 2015/0124586 A1* | 5/2015 | Pani | H04L 12/18 370/219 |
| 2015/0127701 A1 | 5/2015 | Chu et al. | |
| 2015/0236871 A1* | 8/2015 | Kang | H04L 12/4633 370/390 |
| 2016/0094353 A1* | 3/2016 | Sreeramoju | H04L 12/185 370/390 |
| 2016/0232019 A1 | 8/2016 | Shah et al. | |
| 2016/0285641 A1* | 9/2016 | He | H04L 12/185 |
| 2017/0237650 A1* | 8/2017 | Beeram | H04L 12/18 370/390 |
| 2017/0250954 A1 | 8/2017 | Jain et al. | |
| 2017/0302464 A1* | 10/2017 | Hu | H04L 12/185 |
| 2018/0006930 A1 | 1/2018 | Du et al. | |
| 2018/0167320 A1* | 6/2018 | Huang | H04L 61/256 |
| 2019/0068555 A1 | 2/2019 | Tsirkin et al. | |
| 2019/0081899 A1 | 3/2019 | Mundkur et al. | |
| 2019/0273625 A1 | 9/2019 | Tessmer et al. | |
| 2020/0036552 A1 | 1/2020 | Boutros et al. | |
| 2020/0036646 A1 | 1/2020 | Mathew et al. | |

\* cited by examiner

MULTICAST PACKET HANDLING IN LOGICAL NETWORKS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Further, through network virtualization, benefits similar to server virtualization may be derived for networking services in the virtualized computing environment. For example, logical networks may be provisioned, changed, stored, deleted and restored programmatically without having to reconfigure the underlying physical hardware. In practice, multicasting refers to the transmission of information from a source to a group of destinations simultaneously. In a logical network, however, multicast packets are generally treated as unknown unicast packets or broadcast packets, which is inefficient and undesirable.

DETAILED DESCRIPTION

Figure 1:
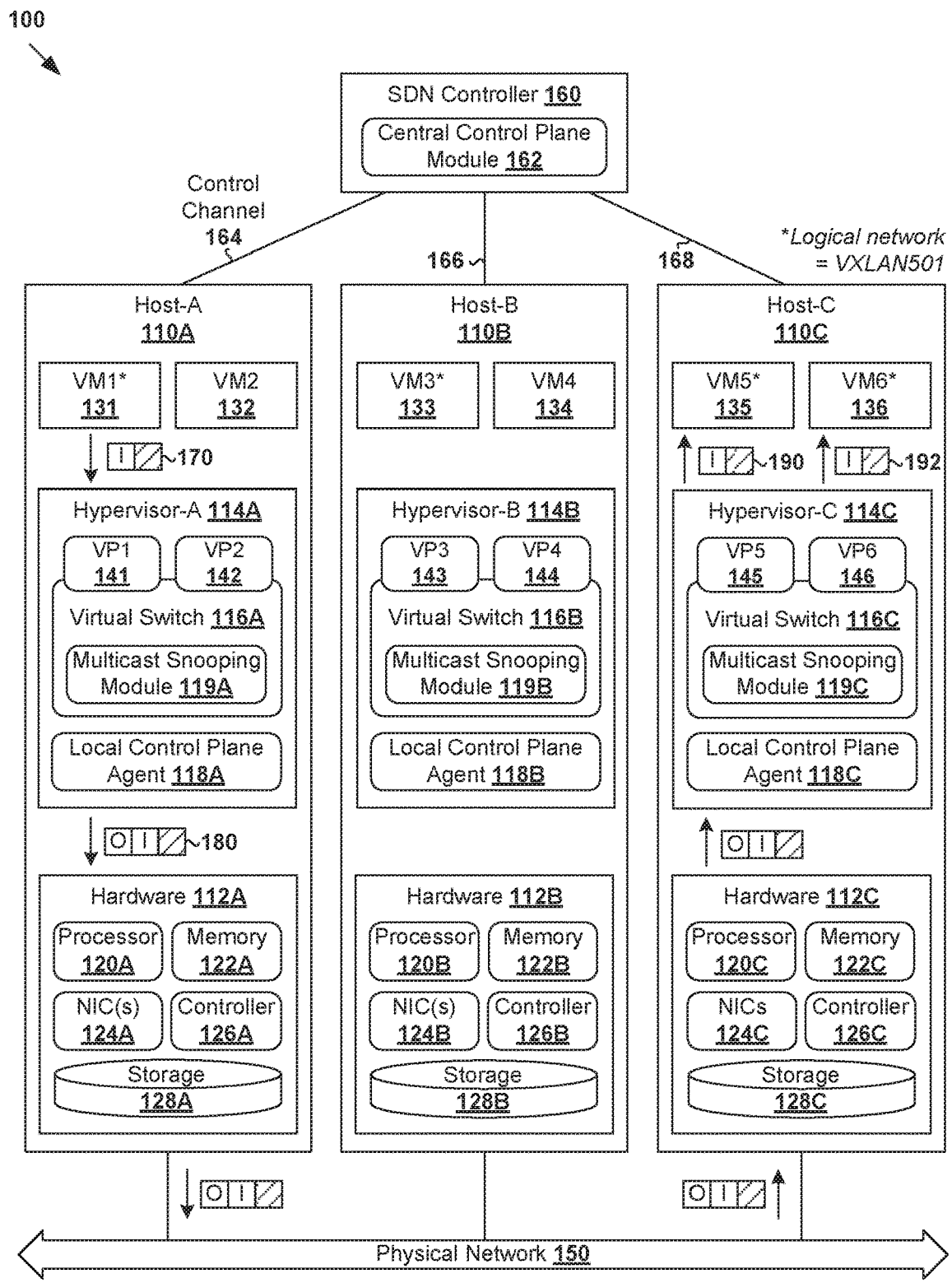
FIG. 1 is a schematic diagram illustrating an example virtualized computing environment in which multicast packet handling in a logical network may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to multicast traffic in logical networks will now be explained in more detail using FIG. 1, which is a schematic diagram illustrating example virtualized computing environment 100 in which multicast packet handling in a logical network may be performed. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are inter-connected via physical network 150. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines 131-136, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. The term "hypervisor" may refer generally to a software layer or component that supports the execution of multiple virtualized computing instances, including system-level software that supports namespace containers such as Docker, etc.

Hypervisor 114A/114B/114C maintains a mapping between underlying hardware 112A/112B/112C and virtual resources allocated to virtual machines 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. For example, corresponding to hardware 112A/112B/112C, the virtual resources may include virtual CPU, virtual memory, virtual disk, virtual network interface controller (VNIC), etc.

Hypervisor 114A/114B/114C further implements virtual switch 116A/116B/116C to handle egress packets from, and ingress packets to, corresponding virtual machines 131-136. Each virtual switch 116A/116B/116C is generally a logical collection of virtual ports. For example in FIG. 1, at host-A 110A, virtual switch 116A is a logical collection of VP1 141 and VP2 142 associated with respective VM1 131 and VM2 132. Similarly, at host-B 110B, virtual switch 116B is a logical collection of VP3 143 and VP4 144 associated with respective VM3 133 and VM4 134. Further, at host-C 110C, VP5 145 and VP6 146 associated with respective VM5 135 and VM6 136. Each virtual switch 116A/116B/116C maintains forwarding information to forward packets to and from corresponding virtual machines 131-136. The term "packet" may refer generally to a group of bits that can be transported together from a source to a destination, such as message, segment, datagram, etc.

SDN controller 160 is a network management entity that facilitates network virtualization in virtualized computing environment 100. Through network virtualization, logical networks may be provisioned, changed, stored, deleted and restored programmatically without having to reconfigure the underlying physical hardware. SDN controller 160 may be implemented using physical machine(s), virtual machine(s), or both. One example of an SDN controller is the NSX controller component of VMware NSX® (available from VMware, Inc.) that operates on a central control plane. SDN controller 160 may be a member of a controller cluster that is configurable using an SDN manager.

Logical networks may be formed using any suitable tunneling protocol, such as Virtual eXtension Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A, VM3 133 on host-B 110B, and VM5 135 and VM6 136 on host-C 110C are located on a VXLAN logical network, such as VXLAN501 (see asterisks in FIG. 1). VM2 132 on host-A 110A and VM4 134 on host-B 110B may be located on a different logical network, such as VXLAN502 (not indicated in FIG. 1 for simplicity).

Host 110A/110B/110C maintains data-plane connectivity with other host(s) to facilitate communication among members of a logical network. In particular, hypervisor 114A/114B/114C implements a virtual tunnel endpoint (VTEP) to encapsulate and decapsulate packets with an outer header (also known as a tunnel header) identifying the logical network. In the example in FIG. 1, hypervisor-A 114A implements a first VTEP, hypervisor-B 114B implements a second VTEP, and hypervisor-C 114C implements a third VTEP. Encapsulated packets may be sent via a tunnel established between a pair of VTEPs over physical network 150. A "tunnel" may generally refer to an end-to-end, bi-directional communication path between a pair of VTEPs.

SDN controller 160 is responsible for collecting and disseminating control information relating to logical networks and overlay transport tunnels to host 110A/110B/110C. For example, the control information may be related to logical network topology, VTEPs, mobility of the virtual machines, firewall rules and policies, etc. To send and receive the control information, local control plane (LCP) agent 118A/118B/118C on host 110A/110B/110C requires control-plane connectivity with SDN controller 160, or more particularly central control plane module 162. In practice, control channel 164/166/168 may be established using any suitable protocol, such as Transmission Control Protocol (TCP) over Secure Sockets Layer (SSL), etc.

Conventionally, in a logical network environment, multicast packets are treated as unknown unicast packets or broadcast packets. This means multicast packets that are addressed to a particular multicast group address will be sent it to all known VTEPs, regardless of whether they interested in the multicast packets. For example in FIG. 1, in response to detecting an egress multicast packet from VM1 131, hypervisor-A 114A (i.e., source VTEP) will send the multicast packet to both hypervisor-B 114B and hypervisor-C 114C (i.e., destination VTEPs). To reach hypervisor-B 114B, a first encapsulated multicast packet is generated by encapsulating the multicast packet with an outer header identifying hypervisor-A 114A as the source VTEP, hypervisor-B 114B as the destination VTEP. To reach hypervisor-C 114C, a second encapsulated multicast packet is generated by encapsulating the multicast packet with an outer header identifying hypervisor-A 114A as the source VTEP, and hypervisor-C 114C as the destination VTEP.

The above conventional approach is undesirable because, in the example in FIG. 1, VM3 133 and VM4 134 on host-B 110B are not be interested in the multicast packet. In this case, resources will be wasted at hypervisor-A 114A to generate and send the encapsulated multicast packet, as well as at hypervisor-B 114B to receive, process and eventually drop the encapsulated multicast packet. The problem is exacerabated when there are multicast applications that continuously generate heavy multicast traffic, such as applications relating to video distribution (e.g., Internet Protocol (IP) television (IPTV) applications, etc.), voice distribution, large file distribution, etc. Further, since there may be tens or hundreds of VTEPs in virtualized computing environment 100, network performance will be adversely affected because physical network 150 will be flooded with unnecessary multicast traffic.

Multicast Packet Handling

According to examples of the present disclosure, multicast communication in a logical network may be improved by leveraging the multicast capability of multicast-enabled network device(s) in physical network 150. For example in FIG. 1, instead of generating multiple encapsulated multicast packets that are addressed to respective destination VTEPs known to hypervisor-A 114A, the outer header is addressed to a multicast group address. This way, multicast-enabled network device(s) in physical network 150 may forward the encapsulated multicast packet to destination(s) associated with the multicast group address, instead of all possible destination VTEPs.

Figure 2:
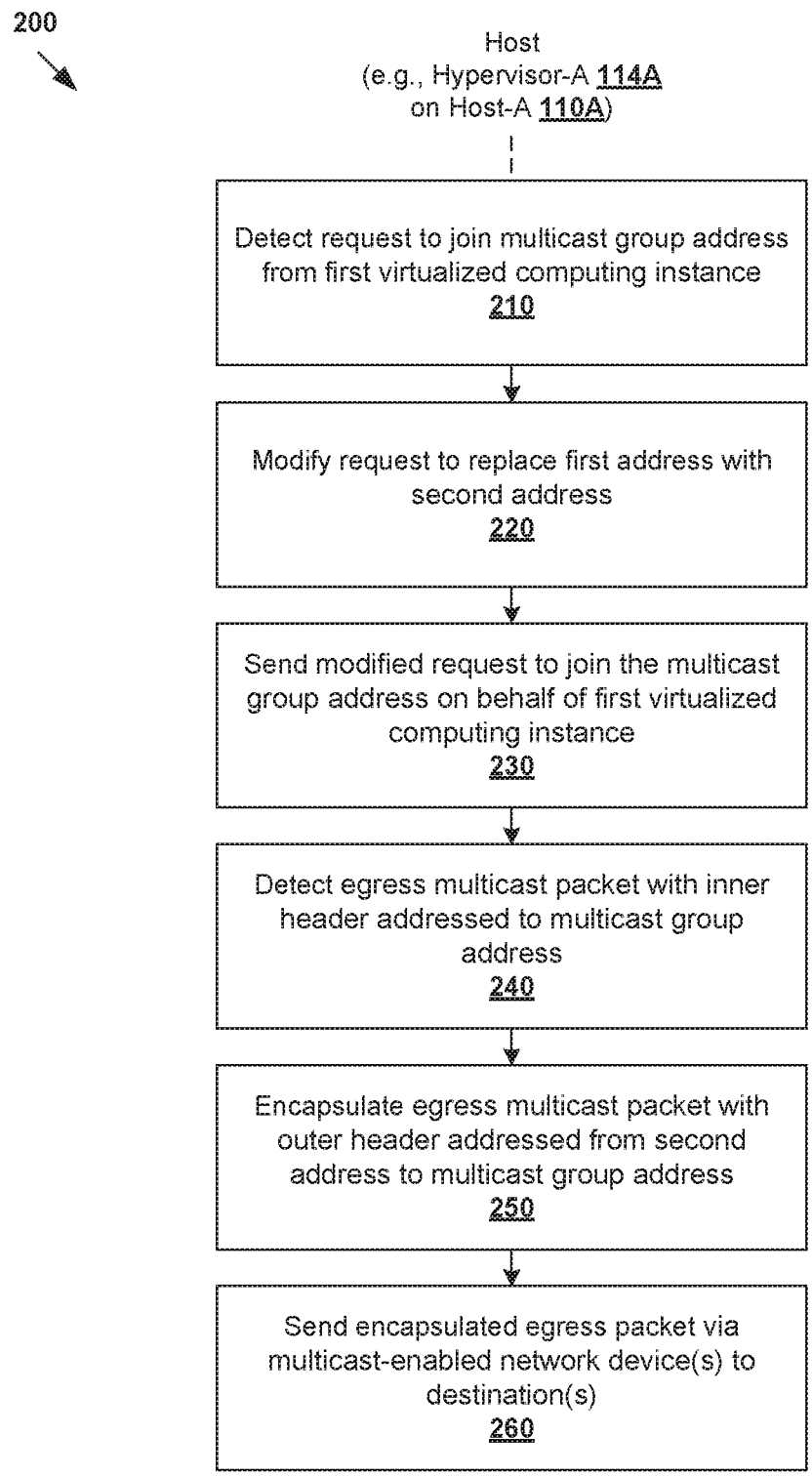
FIG. 2 is a flowchart of an example process for a host to perform multicast packet handling in a logical network.

In more detail, FIG. 2 is a flowchart of example process 200 for a host to perform multicast packet handling in a logical network. Example process 200 may include one or more operations, functions, or actions illustrated by one or more blocks, such as 210 to 260. The various blocks may be combined into fewer blocks, divided into additional blocks, and/or eliminated depending on the desired implementation. In practice, example process 200 may be implemented by any suitable hypervisor 114A/114B/114C supported by host 110A/110B/110C, such as using multicast snooping module 119A/119B/119C at virtual switch 116A/116B/116C.

At 210 in FIG. 2, hypervisor-A 114A detects a request to join a multicast group address from VM1 131. In response, at 220 in FIG. 2, hypervisor-A 114A modifies the request to replace a first address associated with VM1 131 (e.g., first address=IP1) with a second address associated with hypervisor-A 114A (e.g., second address=IPA). Further, at 230 in FIG. 2, the modified request is sent for hypervisor-A 114A to join the multicast group address on behalf of VM1 131, which in turn allows hypervisor-A 114A to act as a multicast proxy for VM1 131.

At 240 in FIG. 2, hypervisor-A 114A detects an egress multicast packet that includes an inner header addressed to the multicast group address (see 170 in FIG. 1). In response, at 250 in FIG. 2, hypervisor-A 114A encapsulates the egress multicast packet with an outer header that is addressed from the second address to the multicast group address (see 180 in FIG. 1). At 260 in FIG. 2, the encapsulated egress multicast packet is sent via one or more multicast-enabled network devices that are capable of forwarding, based on the outer header, the encapsulated egress multicast packet to one or more destinations that have joined the multicast group address.

In the example in FIG. 1, hypervisor-C 114C is an example "destination" that has joined the multicast group address on behalf of VM5 135 and VM6 136. In response to receiving the encapsulated multicast packet, hypervisor-C 114C performs decapsulation to remove the outer header, and sends decapsulated multicast packets to respective VM5 135 and VM6 136 (see 190 and 192 in FIG. 1). On the other hand, since host-B 110B has not joined the multicast group address, it will not receive the multicast traffic.

In practice, a "multicast-enabled network device" may refer generally to a layer-2 switch, layer-3 router, etc., implementing any suitable multicast-enabling protocol. For example, multicast-enabled switches may support Internet Group Management Protocol (IGMP) for Internet Protocol version 4 (IPv4) systems, Multicast Listener Discovery (MLD) for IP version 6 (IPv6) systems, etc. Multicast-enabled routers may support Protocol Independent Multicast (PIM), Distance Vector Multicast Routing Protocol (DVMRP), Multicast Open Shortest Path First (MOSPF), etc. Such multicast-enabled network devices are capable of pruning multicast traffic from links or routes that do not have a multicast destination. The term "layer 2" may refer generally to a link layer or Media Access Control (MAC) layer; and "layer 3" to a network layer or IP layer in the Open System Interconnection (OSI) model, although the concepts described herein may be used with other networking models.

Compared to the conventional approach, examples of the present disclosure provide a more efficient and scalable solution that reduces the likelihood of unnecessary multicast traffic flooding and network resource wastage. Further, examples of the present disclosure may be implemented without any modification at the multicast-enabled network device(s) in underlying physical network 150. Instead, their existing multicast capability is leverage to improve network performance when forwarding multicast traffic.

In the following, various examples will be described using FIG. 3 to FIG. 8. As will be described further using FIG. 3, FIG. 4 and FIG. 8, hypervisor 114A/114C may perform multicast snooping to detect and inspect requests to join or leave the multicast group address. Here, multicast snooping at hypervisor 114A/114C may refer generally to a technique used by hypervisor 114A/114C to monitor multicast activity associated with corresponding virtual machines. Example handling of ingress and egress multicast packets will be described further using FIG. 5, FIG. 6 and FIG. 7.

Joining a Multicast Group Address

Figure 3:
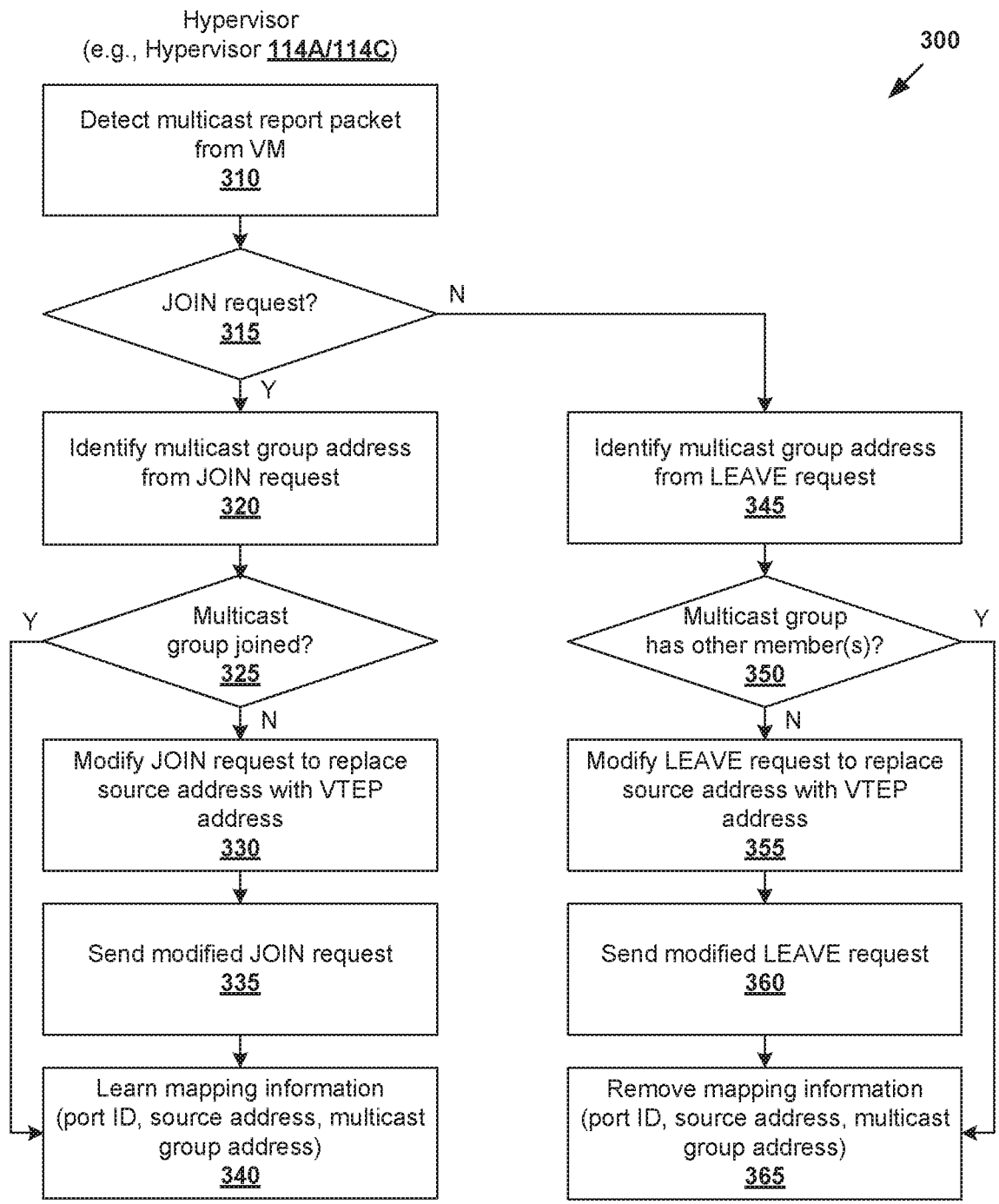
FIG. 3 is a flowchart of an example detailed process for a host to handle requests to join or leave a multicast group address in a logical network.

FIG. 3 is a flowchart of example detailed process 300 for a host to handle requests to join or leave a multicast group address in a logical network. Example process 300 may include one or more operations, functions, or actions illustrated by one or more blocks, such as 310 to 365. The various blocks may be combined into fewer blocks, divided into additional blocks, and/or eliminated depending on the desired implementation. In the following, example process 300 may be implemented by any hypervisor 114A/114C, such as using multicast snooping module 119A/119C at virtual switch 116A/116C. Blocks 310 to 340 in FIG. 3 will be described using FIG. 4, while blocks 345 to 365 will be explained later in the disclosure using FIG. 8.

(a) Join Request From VM1 131

In a first example, hypervisor-A 114A at host-A 110A may perform blocks 310 to 340 in FIG. 3 to snoop on a request to join a multicast group address from VM1 131. In particular, at 310 and 315 in FIG. 3, hypervisor-A 114A detects a request to join a multicast group address from VM1 131.

In practice, any suitable protocol may be used to report multicast group membership to multicast-enabled network device(s). For example, using IGMP version 1 (IGMPv1) or IGMP version 2 (IGMPv2), the join request may represent an IGMP host membership report. IGMP version 3 (IGMPv3) uses a different packet format, in which case an IGMP report packet may be used as a join request. For simplicity, the term "multicast group address" is used to represent a multicast group address used in IGMPv1 and IGMPv2, or a multicast routers group address used in IGMPv3. MLD (e.g., version 1 or version 2) may be used for IPv6 systems.

Figure 4:
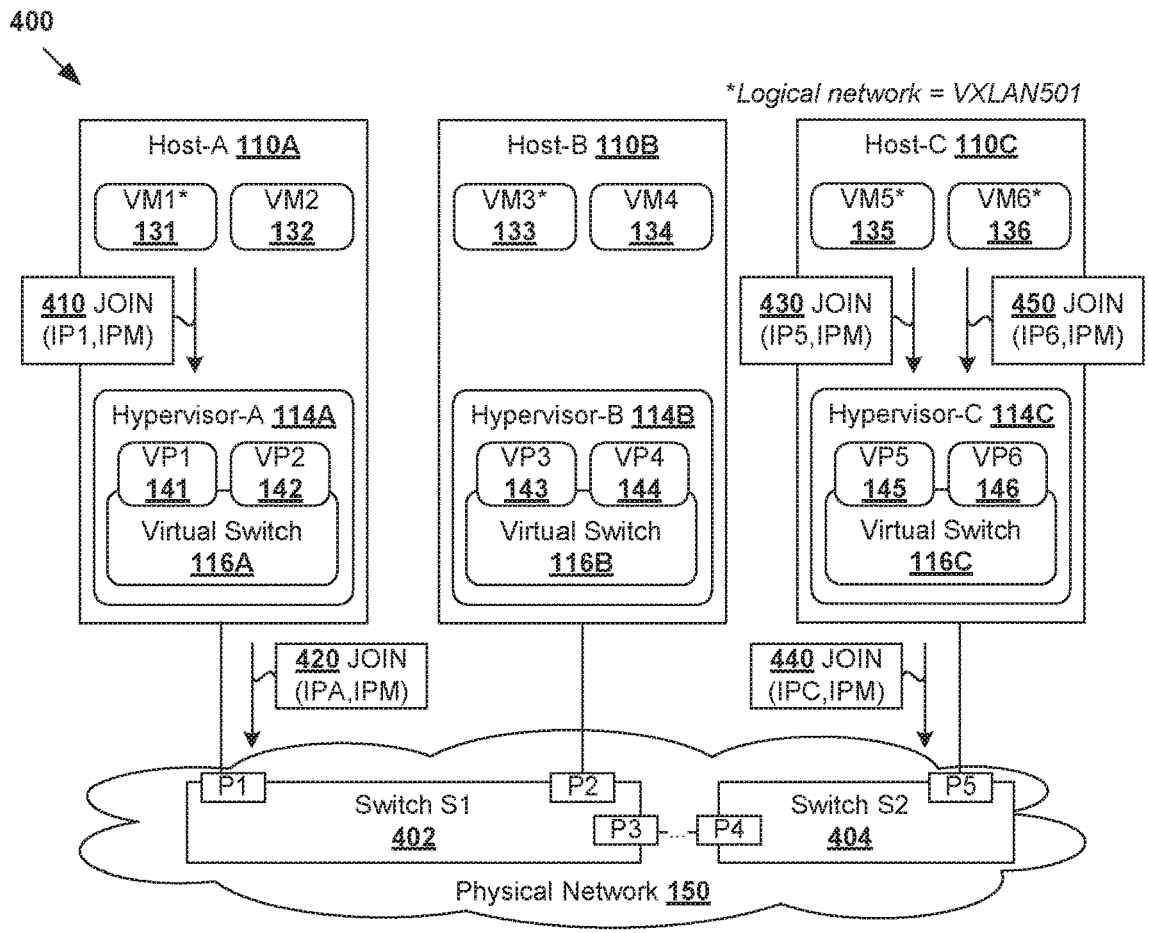
FIG. 4 is a schematic diagram illustrating an example of hosts handling requests to join a multicast group address according to the example in FIG. 3.

FIG. 4 is a schematic diagram illustrating example 400 of hosts handling requests to join a multicast group address according to the example in FIG. 3. In this example, join request 410 includes (source address=IP1, multicast group address=IPM), where IP1 is an IP address associated with VM1 131 and IPM is an multicast group address. In practice, the multicast group address represents a logical identifier for a group of members (e.g., virtual machines, etc.). For example, using IPv4 addressing, the multicast group address may be within the range of 224.0.0.0 to 239.255.255.255 (e.g., IPM=237.11.1.2).

At 320 and 325 in FIG. 3, hypervisor-A 114A identifies the multicast group address from join request 410, and determines whether it has already joined the multicast group on behalf of another virtual machine supported by host-A 110A. If yes (i.e., hypervisor-A 114A has joined the multicast group address), hypervisor-A 114A proceeds to block 340, which will be explained further below. Otherwise (i.e., not a member), hypervisor-A 114A proceeds to block 330 and 335 in FIG. 3.

At 330 in FIG. 3, join request 410 in FIG. 4 is modified by replacing source address=IP1 with IPA, which is an IP address associated with a VTEP implemented by hypervisor-A 114A. At 335 in FIG. 3, modified join request 420 that identifies (source address=IPA, multicast group address=IPM) is sent to allow hypervisor-A 114A to join the multicast group on behalf of VM1 131. This way, hypervisor-A 114A may act as a multicast proxy (e.g., IGMP proxy) for VM1 131. If a subsequent join request is received from another virtual machine, the subsequent join request may be suppressed (to be discussed below using VM5 135 and VM6 136).

At 340 in FIG. 3, hypervisor-A 114A stores multicast mapping information based on join request 410 from VM1 131. Referring to 425 in FIG. 4, hypervisor-A 114A stores (port ID=VP1, source address=IP1, multicast group address=IPM), where the port ID is an identifier of VP1 141 via which the join request is received from VM1 131.

In response to receiving a join packet via a receiving port, multicast-enabled network device(s) in physical network 150 perform IGMP snooping to store multicast mapping information that associates the receiving port with the multicast group address. This way, each multicast-enabled network device does not send a multicast packet out to all ports, but only to ports from which a join request has been received. Physical network 150 may include any suitable number of multicast-enabled network device(s) connecting hosts 110A-110C. In practice, not all network device(s) forming physical network 150 have to be multicast-enabled.

In the example in FIG. 4, physical network 150 includes multicast-enabled layer-2 switches labelled "S1" 402 and "S2" 404. Host-A 110A and host-B 110B are connected to S1 402 via respective ports labelled "P1" and "P2," while host-C 110C is connected to S2 404 via port labelled "P5." S1 402 and S2 404 are connected with each other via respective ports labelled "P3" at S1 402 and "P4" at S2 404. It should be understood that S1 402 and S2 404 may be connected to each other directly, or indirectly via other network device(s) that are not shown for simplicity.

Referring first to S1 402, in response to receiving modified join request 420 via port P1, S1 402 performs IGMP snooping to learn multicast mapping information (port ID=P1, source address=IPA, multicast group address=IPM); see 460 in FIG. 4. At S2 404, the modified join request is received via port P4, in which case multicast mapping information (port ID=P4, source address=IPA, multicast group address=IPM) is stored by S2 404; see 470 in FIG. 4. In practice, the multicast mapping information is usually associated with an expiry time, which is refreshed when a join packet is received via the receiving port.

(b) Join Requests From VM5 135 and VM6 136

In a second example, hypervisor-C 114C at host-C 110C may perform blocks 310 to 340 in FIG. 3 to snoop on requests to join a multicast group address from respective VM5 135 and VM6 136. As shown at 430 in FIG. 4, hypervisor-C 114C detects a join request identifying (source address=IP5, multicast group address=IPM) from VM5 135 via VP5 145. Join request 430 is modified by replacing IP5 with IPC, which is an IP address associated with a VTEP implemented by hypervisor-C 114C, thereby generating modified join request 440.

At 440 in FIG. 4, hypervisor-C 114C sends modified join request 440 that includes (IPC, IPM) to join the multicast group address on behalf of VM5 135. This allows hypervisor-C 114C to act as an IGMP proxy for VM5 135. At 445 in FIG. 4, hypervisor-C 114C also learns multicast mapping information (port ID=VP5, source address=IP5, multicast group address=IPM) based on join request 430.

At S2 404, in response to receiving modified join request 440 from hypervisor-C 114C via port P5, S2 404 learns multicast mapping information (port ID=P5, source address=IPC, multicast group address=IPM). See corresponding entry 475 in FIG. 4. Modified join request 440 also reaches S1 402 via port P3, in which case multicast mapping information (port ID=P3, source address=IPC, multicast group address=IPM). See corresponding entry 465 in FIG. 4.

Referring to hypervisor-C 114C again, at 450 in FIG. 4, a subsequent join request identifying (source address=IP5, multicast group address=IPM) is received from VM6 136 via VP6 146. In this case, since hypervisor-C 114C has already joined the multicast group address on behalf of VM5 135, the join request from VM6 136 is suppressed. According to blocks 325 and 340 in FIG. 3, hypervisor-C 114C proceeds to learn multicast mapping information (port ID=VP6, source address=IP6, multicast group address=IPM); see 455 in FIG. 4.

Since a hypervisor may support tens or hundreds of virtual machine, the join request suppression reduces the number of multicast report packets sent to physical network 150. This in turn reduces the processing burden on multicast-enabled network device(s) on physical network 150 to perform snooping and learn the associated multicast mapping information. In practice, a multicast querier (i.e., device that sends queries) may also be elected to periodically broadcast a membership query packet at predetermined time intervals to trigger the join packets. Virtual machines from different logical networks (e.g., VM1 131 on VXLAN501 and VM7 on VXLAN502, not shown for simplicity) may also join the same multicast group address.

Multicast Packet Handling

Figure 5:
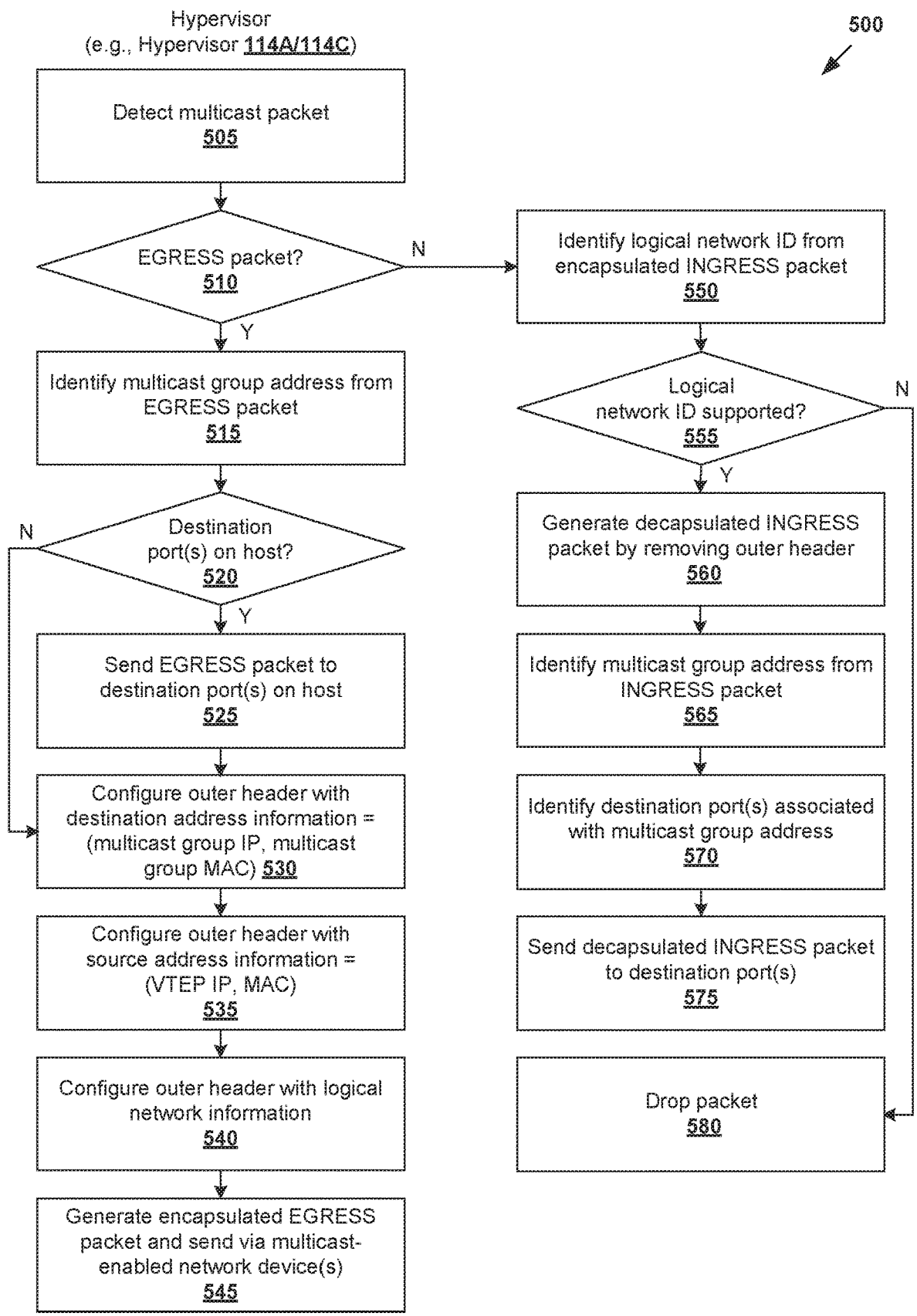
FIG. 5 is a flowchart of an example detailed process for a host to handle multicast packets addressed to a multicast group address in a logical network.

FIG. 5 is a flowchart of example detailed process 500 for a host to handle multicast packets addressed to a multicast group address in a logical network. Example process 500 may include one or more operations, functions, or actions illustrated by one or more blocks, such as 505 to 580. The various blocks may be combined into fewer blocks, divided into additional blocks, and/or eliminated depending on the desired implementation. In the following, example process 500 may be implemented by any hypervisor 114A/114C, such as using multicast snooping module 119A/119C at virtual switch 116A/116C.

(a) Multicast Packets From VM1 131

In a first example, consider the case where VM1 131 on host-A 110A sends multicast packets to multicast group address=IPM. This example will be explained using FIG. 6, which is a schematic diagram illustrating first example 600 of hosts handling multicast packets addressed to a multicast group address according to the example in FIG. 5.

According to 505 and 510 in FIG. 5, hypervisor-A 114A detects an egress multicast packet from VM1 131 via port VP1 141. In the example in FIG. 6, egress multicast packet 610 includes inner header 612 (labelled "I") and payload 614. Inner header 612 includes source address information (source IP address=IP1, source MAC address=MAC1) associated with VM1 131. Inner header 612 further includes destination address information (multicast group address=IPM, multicast group MAC address=MACM). Depending on the desired implementation, multiple IP addresses may be mapped to the same multicast group MAC address (e.g., 01:00:5e:0a:00:01 mapped to 32 IP addresses).

At 515 and 520 in FIG. 5, hypervisor-A 114A identifies multicast group address=IPM from inner header 612, and determines whether there is any (local) destination port on host-A 110A for the multicast group address. In particular, based on multicast mapping information (VP1, IP1, IPM) at 425 in FIG. 4, VP1 141 is the only port associated with IPM on host-A 110A (i.e., no other destination port). In this case, hypervisor-A 114A proceeds to block 530 in FIG. 5.

Instead of sending the egress muticast packet to all known destination VTEPs according to the conventional approach, hypervisor-A 114A leverages the multicast-enabled network device(s) in physical network 150 to reach destination(s) associated with the multicast group address. Specifically, at 525, 535 and 540 in FIG. 5, hypervisor-A 114A configures an outer header (labelled "O") for the egress multicast packet. At 545 in FIG. 5, an encapsulated multicast packet is generated and sent to physical network 150.

Figure 6:
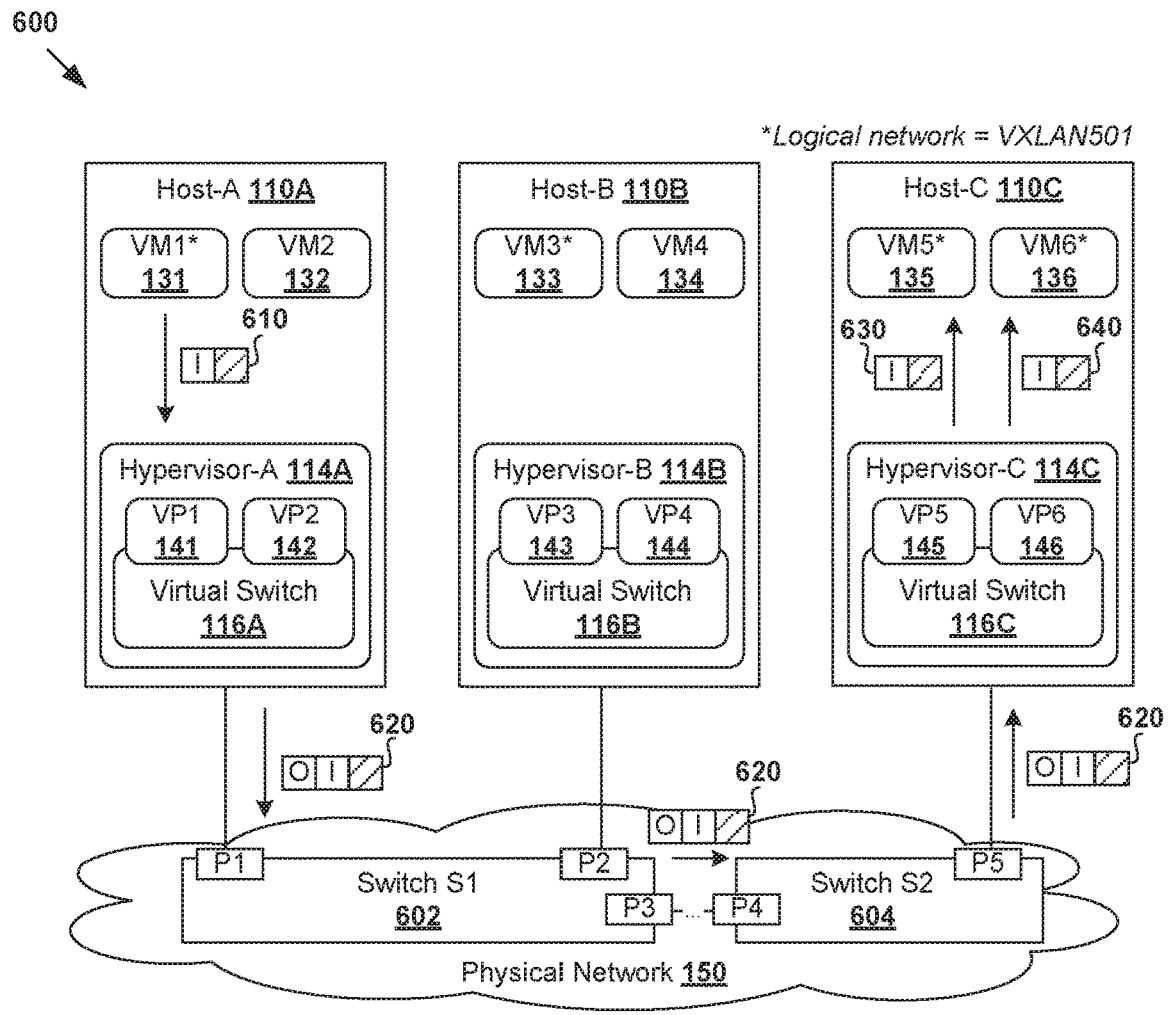
FIG. 6 is a schematic diagram illustrating a first example of hosts handling multicast packets addressed to a multicast group address according to the example in FIG. 5.

In the example in FIG. 6, encapsulated multicast packet 620 includes outer header 622 identifying destination address information (multicast group address=IPM, multicast group MAC address=MACM), source address information (VTEP IP address=IPA, VTEP MAC address=MACA) associated with source VTEP implemented by hypervisor-A 114A, and a logical network ID (e.g., VNI=VXLAN501) on which VM1 131 is located. In other words, the destination address information in outer header 622 is the same as that of inner header 612.

At switch S1 402, encapsulated multicast packet 620 is received via port P1. Based on multicast mapping information (P1, IPA, IPM) at 460 and (P3, IPC, IPM) at 465 in FIG. 4, S1 402 determines that destination IP address=IPM is associated with ports P1 and P3. In response, switch S1 402 forwards encapsulated multicast packet 620 to each port associated with IPM, except for receiving port=P1 via which encapsulated multicast packet 620 is received. As such, encapsulated multicast packet 620 is forwarded via port P3.

At switch S2 404, encapsulated multicast packet 620 is received via port P4. Based on multicast mapping information (P4, IPA, IPM) at 470 and (P5, IPC, IPM) at 475 in FIG. 4, switch S2 404 determines that destination IP address=IPM is associated with ports P4 and P5. Since encapsulated multicast packet 620 is received via port P4, switch S2 404 forwards encapsulated multicast packet 620 via port P5 connected to host-C 110C.

At host-C 110C, hypervisor-C 114C receives encapsulated multicast packet 620 (i.e., an ingress packet) from switch S2 404. According to blocks 550 and 555 in FIG. 5, hypervisor-C 114C examines the logical network ID in encapsulated multicast packet 620, and determines whether the logical network is supported by hypervisor-C 114C. If the logical network is not supported, hypervisor-C 114C proceeds to drop encapsulated multicast packet 620 according to block 580 in FIG. 5.

Otherwise (i.e., logical network supported), at 560 in FIG. 5, hypervisor-C 114C proceeds to decapsulate encapsulated multicast packet 620 to remove outer header 622. At 565 in FIG. 5, hypervisor-C 114C identifies multicast group address=IPM in inner header 612. At 570 in FIG. 5, hypervisor-C 114C identifies destination ports=(VP5, VP6) associated with the multicast group address based on multicast mapping information (VP5, IP5, IPM) at 445 and (VP6, IP6, IPM) at 455 in FIG. 4, respectively.

At 575 in FIG. 5, hypervisor-C 114C sends decapsulated multicast packet 630 via VP5 145 to VM5 135, as well as decapsulated multicast packet 640 via VP6 146 to VM6 136. Decapsulated multicast packet 630/640 is the same as multicast packet 610 that originates from VM1 131 and also includes inner header 612 and packet payload 614.

(b) Multicast Packets From VM5 135

In a second example, consider the case where VM5 135 on host-C 110C sends multicast packets to multicast group address=IPM. This example will be explained using FIG. 7, which is a schematic diagram illustrating second example 700 of hosts handling multicast packets addressed to a multicast group address according to the example in FIG. 5.

According to 505 and 510 in FIG. 5, hypervisor-C 114C detects an egress multicast packet via port VP5 145 associated with VM5 135. In the example in FIG. 7, egress multicast packet 710 includes inner header 712 and payload 714. Inner header 712 includes source address information (source IP address=IP5, source MAC address=MAC5) associated with VM5 135. Inner header 712 further includes destination address information (multicast group address=IPM, multicast group MAC address=MACM).

At 515 and 520 in FIG. 5, hypervisor-C 114C identifies multicast group address=IPM from inner header 712, and determines whether there is any destination port on host-C 110C for the multicast group address. In particular, based on multicast mapping information (VP6, IP6, IPM) at 455 in FIG. 4, hypervisor-C 114C identifies VP6 146 as a destination port. At 525 in FIG. 5, multicast packet 710 is forwarded to VM6 136 via VP6 146.

At 525, 535 and 540 in FIG. 5, hypervisor-C 114C configures an outer header for multicast packet 710. In the example in FIG. 7, outer header 722 identifying destination address information (multicast group address=IPM, multicast group MAC address=MACM), source address information (source VTEP IP address=IPC, source VTEP MAC address=MACC) associated with a source VTEP implemented by hypervisor-C 114C, and a logical network ID (e.g., VNI=VXLAN501) on which VM5 135 is located. At 545 in FIG. 5, encapsulated multicast packet 720 is generated and sent to physical network 150.

By configuring outer header 722, hypervisor-C 114C is able to leverage the multicast forwarding mechanism of multicast-enabled switches S1 402 and S2 404 in physical network 150. In particular, at S2 404, encapsulated multicast packet 720 is received via port P5. Based on multicast mapping information (P4, IPA, IPM) at 470 and (P5, IPC, IPM) at 475 in FIG. 4, S2 404 determines that destination IP address=IPM is associated with ports P4 and P5. Since encapsulated multicast packet 720 is received via port P5, S2 404 forwards encapsulated multicast packet 720 via port P4.

At switch S1 402, encapsulated multicast packet 720 is received via port P3. Based on multicast mapping information (P1, IPA, IPM) at 460 and (P3, IPC, IPM) at 465 in FIG. 4, switch S1 402 determines that destination IP address=IPM is associated with ports P1 and P3. Since encapsulated multicast packet 720 is received via port P3, S2 404 forwards encapsulated multicast packet 720 via port P1.

At host-A 110A, hypervisor-A 114A receives encapsulated multicast packet 720 (i.e., an ingress packet) from switch S1 402. According to blocks 550 and 555 in FIG. 5, hypervisor-A 114A examines the logical network ID in encapsulated multicast packet 720, and determines whether the logical network is supported. If not supported, hypervisor-A 114A proceeds to drop encapsulated multicast packet 720 according to block 580 in FIG. 5.

Otherwise (i.e., logical network supported), at 560 in FIG. 5, hypervisor-A 114A performs decapsulation to remove outer header 722 from encapsulated multicast packet 720. At 565 in FIG. 5, hypervisor-A 114A identifies multicast group address=IPM in inner header 712. At 575 in FIG. 5, hypervisor-A 114A identifies destination port=VP1 141 associated with the multicast group address based on multicast mapping information (VP1, IP1, IPM) at 425 in FIG. 4.

At 575 in FIG. 5, hypervisor-A 114A sends decapsulated multicast packet 730 via VP1 141 to VM1 131. Decapsulated multicast packet 730 is the same as multicast packet 710 that originates from VM5 135 and also includes inner header 712 and packet payload 714. Otherwise, at 580 in FIG. 5, in response to determination that the multicast group is not associated with any destination port(s) on host-A 110A, decapsulated multicast packet 730 is dropped.

Figure 7:
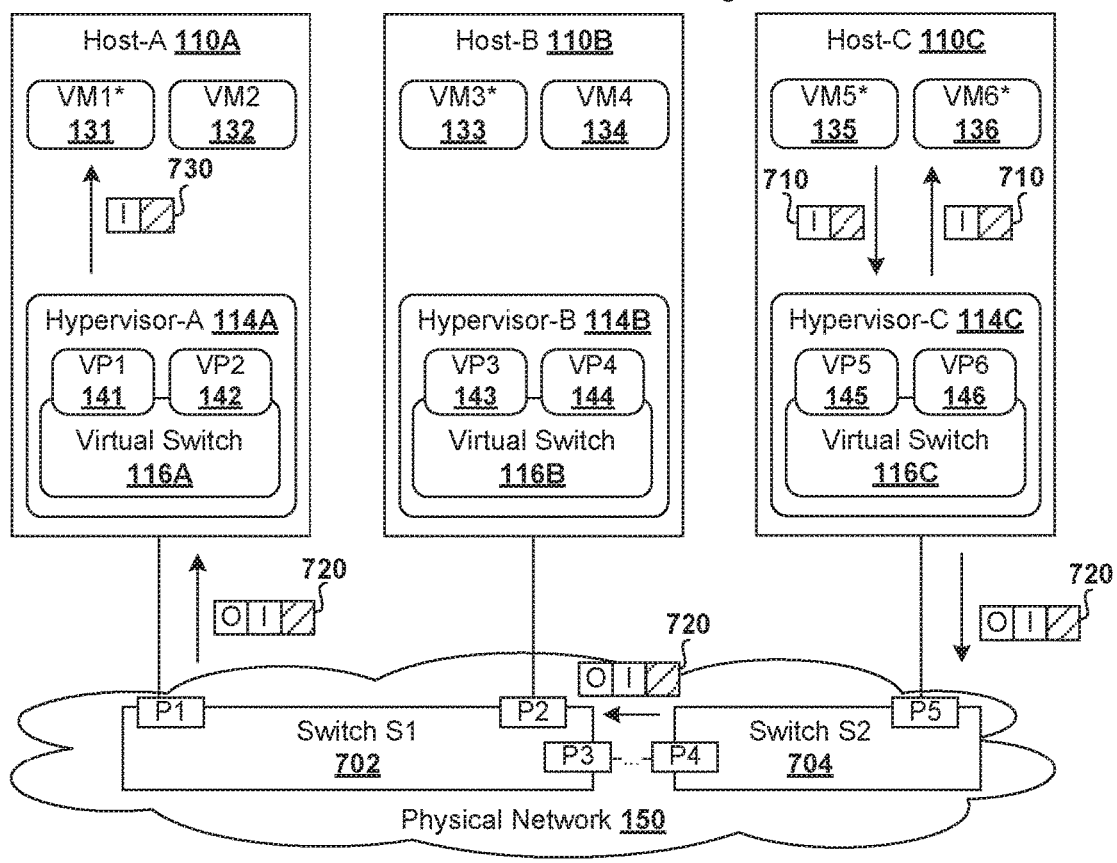
FIG. 7 is a schematic diagram illustrating a second example of hosts handling multicast packets addressed to a multicast group address according to the example in FIG. 5.

In the above examples, host-B 110B does not receive encapsulated multicast packet 620 from hypervisor-A 114A in FIG. 6, nor encapsulated multicast packet 720 from hypervisor-C 114C in FIG. 7. For example, multicast-enabled switch S1 402 does not forward encapsulated multicast packet 620/720 via port P2 to host-B 110B because S1 402 has not received any request to join the multicast group address that port. According to the above examples, multicast group address=IPM is configured in outer header 622/722, instead of being "hidden" from switch 402/404 in inner header 612/712 according to the conventional approach. This in turn allows the multicast forwarding mechanism of the multicast-enabled switches to be leveraged to reach destination(s) associated with the multicast group address.

Leaving a Multicast Group Address

Referring to FIG. 3 again, snooping may be performed to detect requests to leave a multicast group address. Some examples will be described below with reference to FIG. 8, which is a schematic diagram illustrating example 800 of hosts handling requests to leave a multicast group address according to the example in FIG. 3.

At 310 and 315 in FIG. 3, hypervisor-A 114A at host-A 110A may perform snooping to detect a request to leave a multicast group address from VM1 131. In the example in FIG. 8, leave request 810 may be an IGMP leave packet identifying (source address=IP1, multicast group address=IPM). At 345 and 350 in FIG. 3, hypervisor-A 114A determines whether multicast group address=IPM is associated with at least one other virtual machine besides VM1 131. If the determination at 350 is affirmative, hypervisor-A 114A proceeds to block 365 (to be explained below).

Figure 8:
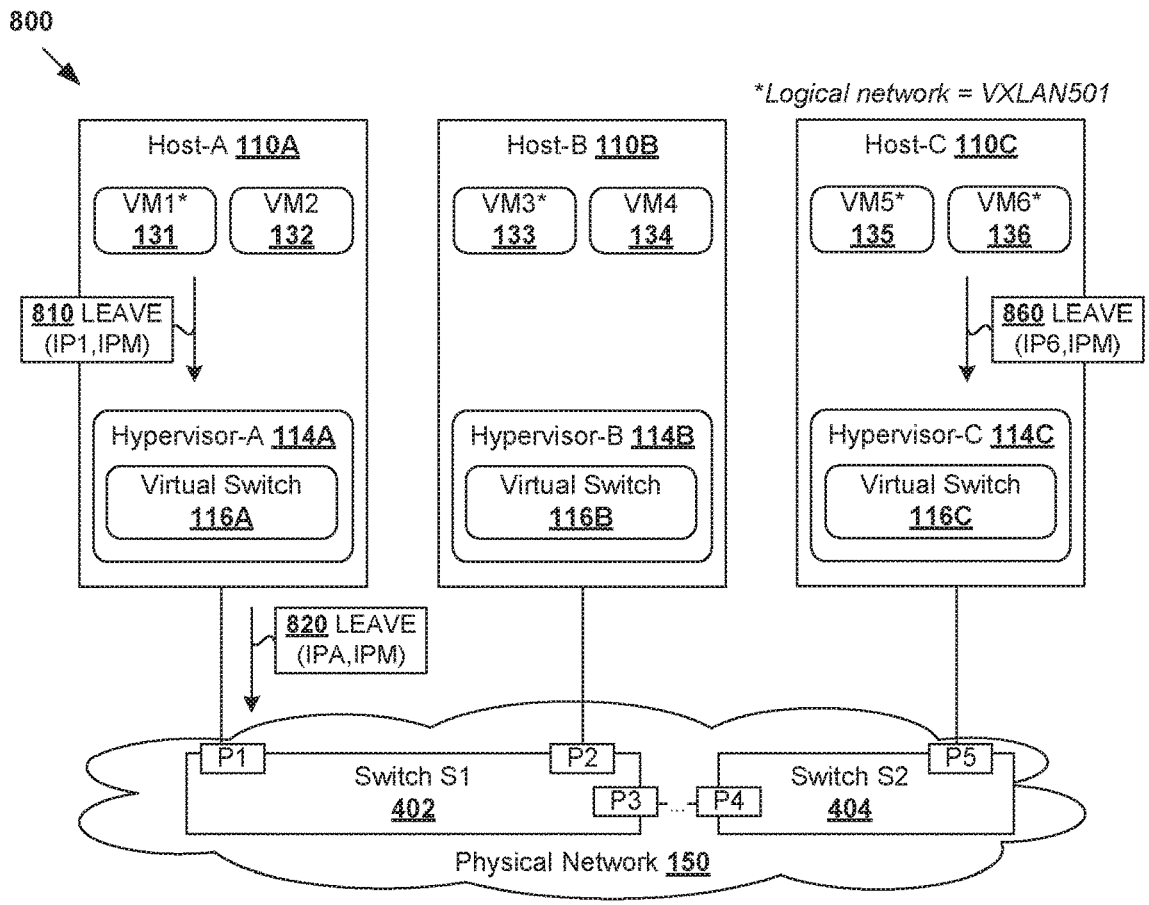
FIG. 8 is a schematic diagram illustrating an example of hosts handling requests to leave a multicast group address according to the example in FIG. 3.

Otherwise (i.e., multicast group address is not associated with at least one other virtual machine), hypervisor-A 114A proceeds to block 355 and 360 in FIG. 3. In particular, leave request 810 in FIG. 8 is modified by replacing IP1 associated with VM1 131 with IPA associated with a VTEP implemented by hypervisor-A 114A. Modified leave request 820 identifying (IPA, IPM) is then sent to allow hypervisor-A 114A to leave the multicast group address. At 365 in FIG. 3, hypervisor-A 114A also removes multicast mapping information (VP1, IP1, IPM) based on leave request 810. See removed entry 830 in FIG. 8.

At switch S1 402, modified leave request 820 from hypervisor-A 114A is received via port P1. This causes S1 402 to remove multicast mapping information (P1, IPA, IPM); see corresponding removed entry 840 in FIG. 4. Modified leave request 820 is also received by S2 404 via port P4. This causes S2 404 to remove multicast mapping information (P4, IPA, IPM). See corresponding removed entry 850 in FIG. 8.

Similarly, hypervisor-C 114C at host-C 110C may perform blocks 345-365 in FIG. 3 to snoop on requests to leave a multicast group address. In the example in FIG. 8, hypervisor-C 114C detects leave request 860 identifying (IP6, IPM) from VM6 136 via VP6 146. In this case, since multicast group has at least one other member (i.e., VM5 135), it is not necessary to modify and send the leave request from VM6 136. Instead, as shown at 870 in FIG. 8, hypervisor-C 114C proceeds to remove multicast mapping information (VP6, IP5, IPM) according to blocks 345 and 365 in FIG. 3. In other words, the leave request is suppressed. This way, hypervisor-C 114C may continue to act as a proxy for VM5 135 to receive multicast packets addressed to the multicast group address on behalf of VM5 135.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as host 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform multicast packet handling in a logical network, wherein the host supports a virtualized computing instance located on the logical network and a hypervisor, and the method comprises:

in response to the hypervisor detecting from the virtualized computing instance a request to join a multicast group address, and prior to detecting an egress multicast packet from the virtualized computing instance:
determining whether the hypervisor has already joined the multicast group address;

in response to determining that the hypervisor has already joined the multicast group address, storing multicast mapping information based on the request;

in response to determining that the hypervisor has not already joined the multicast group address:

modifying, by the hypervisor, the request by replacing a first address included in the request and associated with the virtualized computing instance with a second address of a source virtual tunnel endpoint (VTEP) implemented by the hypervisor, wherein the modified request to join the multicast group address includes the second address and the multicast group address;

sending, by the hypervisor, the modified request to join the multicast group address to act as a multicast proxy for the virtualized computing instance; and storing multicast mapping information based on the request;

in response to the hypervisor detecting, from the virtualized computing instance, the egress multicast packet that includes a first header addressed to the multicast group address, encapsulating, by the hypervisor, the egress multicast packet with an outer header that is addressed from the second address to the multicast group address; and sending, by the hypervisor, the encapsulated egress multicast packet via one or more multicast-enabled network devices that are capable of forwarding, based on the outer header, the encapsulated egress multicast packet to one or more destinations that have joined the multicast group address.

2. The method of claim 1, wherein modifying the request is in response to determination that the hypervisor has not already joined the multicast group address on behalf of at least one other virtualized computing instance supported by the host.

3. The method of claim 1, wherein encapsulating the egress packet comprises:

configuring the outer header to include an identifier of the logical network, wherein the one or more destinations are each a destination hypervisor that implements a destination VTEP and has joined the multicast group address on behalf of one or more destination virtualized computing instance located on the logical network.

4. The method of claim 1, wherein storing multicast mapping information comprises storing information that associates the multicast group address with a virtual port via which the request is received from the virtualized computing instance.

5. The method of claim 4, wherein the method further comprises:

in response to the hypervisor detecting an encapsulated ingress multicast packet with an outer header that includes the multicast group address, generating a decapsulated ingress multicast packet by removing the outer header from the encapsulated ingress multicast packet; and based on the multicast mapping information, sending the decapsulated ingress multicast packet to the virtualized computing instance via the virtual port associated with the multicast group address.

6. The method of claim 1, wherein the method further comprises:

in response to the hypervisor detecting a request to leave a multicast group address from the virtualized computing instance, determining whether the multicast group address is associated with at least one other virtualized computing instance supported by the host.

7. The method of claim 6, wherein the method further comprises:

in response to determination by the hypervisor that the multicast group address is not associated with the at least one other virtualized computing instance, modifying the request to leave by replacing the first address associated with the virtualized computing instance in the request with the second address associated with the hypervisor; and sending the modified request to leave the multicast group address.

8. A non-transitory computer-readable storage medium that includes a set of instructions which, in response to execution by a processor of a host, cause the processor to perform a method of multicast packet handling in a logical network, wherein the host supports a virtualized computing instance located on the logical network and a hypervisor, and the method comprises:

in response to the hypervisor detecting from the virtualized computing instance a request to join a multicast group address and prior to detecting an egress multicast packet from the virtualized computing instance:

determining whether the hypervisor has already joined the multicast group address;

in response to determining that the hypervisor has already joined the multicast group address, storing multicast mapping information based on the request;

in response to determining that the hypervisor has not already joined the multicast group address:

modifying, by the hypervisor, the request by replacing a first address included in the request and associated with the virtualized computing instance with a second address of a source virtual tunnel endpoint (VTEP) implemented by the hypervisor, wherein the modified request to join the multicast group address includes the second address and the multicast group address;

sending, by the hypervisor, the modified request to join the multicast group address to act as a multicast proxy for the virtualized computing instance; and storing multicast mapping information based on the request;

in response to the hypervisor detecting, from the virtualized computing instance, an egress multicast packet that includes a first header addressed to the multicast group address, encapsulating, by the hypervisor, the egress multicast packet with an outer header that is addressed from the second address to the multicast group address; and sending, by the hypervisor, the encapsulated egress multicast packet via one or more multicast-enabled network devices that are capable of forwarding, based on the outer header, the encapsulated egress multicast packet to one or more destinations that have joined the multicast group address.

9. The non-transitory computer-readable storage medium of claim 8, wherein modifying the request is in response to determination that the hypervisor has not already joined the multicast group address on behalf of at least one other virtualized computing instance supported by the host.

10. The non-transitory computer-readable storage medium of claim 8, wherein encapsulating the egress packet comprises:

configuring the outer header to include an identifier of the logical network, wherein the one or more destinations are each a destination hypervisor that implements a destination VTEP and has joined the multicast group address on behalf of one or more destination virtualized computing instance located on the logical network.

11. The non-transitory computer-readable storage medium of claim 8, wherein storing multicast mapping information comprises storing information that associates the multicast group address with a virtual port via which the request is received from the virtualized computing instance.

12. The non-transitory computer-readable storage medium of claim 11, wherein the method further comprises:
in response to the hypervisor detecting an encapsulated ingress multicast packet with an outer header that includes the multicast group address,
generating a decapsulated ingress multicast packet by removing the outer header from the encapsulated ingress multicast packet; and
based on the multicast mapping information, sending the decapsulated ingress multicast packet to the virtualized computing instance via the virtual port associated with the multicast group address.

13. The non-transitory computer-readable storage medium of claim 8, wherein the method further comprises:
in response to the hypervisor detecting a request to leave a multicast group address from the virtualized computing instance, determining whether the multicast group address is associated with at least one other virtualized computing instance supported by the host.

14. The non-transitory computer-readable storage medium of claim 13, wherein the method further comprises:
in response to determination by the hypervisor that the multicast group address is not associated with the at least one other virtualized computing instance,
modifying the request to leave by replacing the first address associated with the virtualized computing instance in the request with the second address associated with the hypervisor; and
sending the modified request to leave the multicast group address.

15. A host configured to perform multicast packet handling in a logical network, wherein the host comprises:
a processor; and
a non-transitory computer-readable medium having stored thereon instructions that, when executed by the processor, cause the processor to support a virtualized computing instance located on the logical network and a hypervisor, and perform the following:
in response to the hypervisor detecting from the virtualized computing instance a request to join a multicast group address and prior to detecting an egress multicast packet from the virtualized computing instance:
determine whether the hypervisor has already joined the multicast group address;
in response to determination that the hypervisor has already joined the multicast group address, store multicast mapping information based on the request;
in response to determination that the hypervisor has not already joined the multicast group address:
modify, by the hypervisor, the request by replacing a first address included in the request and associated with the virtualized computing instance with a second address of a source virtual tunnel endpoint (VTEP) implemented by the hypervisor but keeping the multicast group address unchanged, wherein the modified request to join the multicast group address includes the second address and the multicast group address;
send, by the hypervisor, the modified request to join the multicast group address to act as a multicast proxy for the virtualized computing instance; and
store multicast mapping information based on the request;
in response to the hypervisor detecting, from the virtualized computing instance, an egress multicast packet that includes a first header addressed to the multicast group address,
encapsulate, by the hypervisor, the egress multicast packet with an outer header that is addressed from the second address to the multicast group address; and
send, by the hypervisor, the encapsulated egress multicast packet via one or more multicast-enabled network devices that are capable of forwarding, based on the outer header, the encapsulated egress multicast packet to one or more destinations that have joined the multicast group address.

16. The host of claim 15, wherein the instructions for modifying the request are in response to determination that the hypervisor has not already joined the multicast group address on behalf of at least one other virtualized computing instance supported by the host.

17. The host of claim 15, wherein the instructions for encapsulating the egress packet cause the processor to:
configure the outer header to include an identifier of the logical network, wherein the one or more destinations are each a destination hypervisor that implements a destination VTEP and has joined the multicast group address on behalf of one or more destination virtualized computing instance located on the logical network.

18. The host of claim 15, wherein the instructions for storing multicast mapping information further cause the processor to: store information that associates the multicast group address with a virtual port via which the request is received from the virtualized computing instance.

19. The host of claim 18, wherein the instructions further cause the processor to:
in response to the hypervisor detecting an encapsulated ingress multicast packet with an outer header that includes the multicast group address,
generate a decapsulated ingress multicast packet by removing the outer header from the encapsulated ingress multicast packet; and
based on the multicast mapping information, send the decapsulated ingress multicast packet to the virtualized computing instance via the virtual port associated with the multicast group address.

20. The host of claim 15, wherein the instructions further cause the processor to:
in response to the hypervisor detecting a request to leave a multicast group address from the virtualized computing instance, determine whether the multicast group address is associated with at least one other virtualized computing instance supported by the host.

21. The host of claim 20, wherein the instructions further cause the processor to:
in response to determination by the hypervisor that the multicast group address is not associated with the at least one other virtualized computing instance,
modify the request to leave by replacing the first address associated with the virtualized computing instance in the request with the second address associated with the hypervisor; and send the modified request to leave the multicast group address.

\* \* \* \* \*